United States Patent [19]

Cherukuri et al.

[11] Patent Number: 5,043,169

[45] Date of Patent: Aug. 27, 1991

[54] STABILIZED SWEETNER COMPOSITION

[75] Inventors: Subraman R. Cherukuri, Towaco; Tommy L. Chau, Bridgewater, both of N.J.; Gul Mansukhani, Staten Island, N.Y.; Angel M. Orama, Stanhope, N.J.

[73] Assignee: Warner-Lambert Company, Morris Plains, N.J.

[21] Appl. No.: 530,769

[22] Filed: May 25, 1990

[51] Int. Cl.$^5$ ............................................ A23G 3/30
[52] U.S. Cl. .................................. 426/5; 426/548; 426/658; 426/454; 426/453; 426/99; 426/96
[58] Field of Search ................ 426/96, 99, 548, 658, 426/454, 453

[56] References Cited

U.S. PATENT DOCUMENTS

| | | | |
|---|---|---|---|
| 3,711,301 | 1/1973 | Asogawa et al. | 426/96 |
| 4,386,106 | 5/1983 | Merritt et al. | 426/96 |
| 4,515,769 | 5/1985 | Merritt et al. | 426/96 |
| 4,634,593 | 1/1987 | Stroz et al. | 426/99 |
| 4,753,805 | 6/1988 | Cherukuri et al. | 426/454 |
| 4,828,857 | 9/1989 | Sharma et al. | 426/99 |
| 4,839,184 | 6/1989 | Cherukuri et al. | 426/99 |
| 4,871,558 | 10/1989 | Tackikawa et al. | 426/96 |
| 4,885,175 | 12/1989 | Zibell | 426/99 |
| 4,911,934 | 3/1990 | Yang et al. | 426/96 |

*Primary Examiner*—Jeanette Hunter
*Attorney, Agent, or Firm*—Bell, Craig M.

[57] ABSTRACT

A stabilized dipeptide sweetening composition useful in chewing gum applications provides longer shelf life stability and improved longer lasting sweetness. A dipeptide sweetner such as appartame is encapsulated through an anhydrous process that compresses the crystals with a mixture of inert binder ingredients so as to form a solid tablet or sheet which is then ground into fine granular particles. These particles may then be coated with a hydrophobic material such as a fat or wax and then incorporated into a variety of food applications such as chewing gum. The sweetener composition is thereby protected from adverse environmental conditions such as high temperature, moisture and pH.

33 Claims, 5 Drawing Sheets

STABILIZED SWEETNER COMPOSITION

FIELD OF THE INVENTION

The present invention relates generally to the encapsulation of high intensity sweeteners for the purpose of stability in numerous food applications. In particular, it relates to the encapsulation of dipeptide sweeteners such as aspartame that possess greater stability and longer shelf life for use in chewing gum compositions.

BACKGROUND OF THE INVENTION

Whereas the dipeptide sweetener known as aspartame (alpha-L-aspartyl-L-phenyalanine methyl ester) or APM has revolutionized the low calorie food and beverage industries, the sweetener is not without its drawbacks. Of major significance is the sweetener's instability in the presence of heat, moisture and alkaline environments. This instability has prevented its use in most if not all cooking and baking applications and is a factor that must be considered in products that require a long shelf life. Many attempts have been made using different coatings and/or physical/mechanical processing parameters to increase the stability of APM for this purpose and yet there still is much room for improvement.

U.S. Pat. No. 4,384,004 to Cea et al discloses the encapsulation of APM with one or a number of different coatings consisting of cellulose, cellulose derivatives, vinyl polymers, gelatin, zein, waxes and mixtures thereof in a ratio of coating material to APM of 1:1 or less. The APM is coated by conducting the APM particles in a stream of air that passes through a zone of atomized liquid droplets of the coating material thereby forming discrete layers about the APM particles under substantially anhydrous conditions. The stabilized APM particles are particularly useful in chewing gum applications.

U.S. Pat. Nos. 4,122,195 and 4,139,639 to Bahoshy et al propose to "fix" APM by preparing it with a material such as gum arabic or the reaction product of a compound containing a polyvalent metallic ion, with an ungelatinized starch acid-ester of a substituted dicarboxyllic acid by a spray-drying technique wherein the APM and film former are prepared in an emulsion. While the technique reportedly shows some improvement in shelf stability, relatively rapid breakdown of the APM still occurs.

U.S. Pat. No. 4,828,857 to Sharma et al discloses a sweetener delivery system wherein the sweetener core material is formed in an agglomerate hydrophobic matrix by spray congealing. The agglomerated matrix is selected from the group consisting of waxes, fatty acids and mixtures thereof. The agglomerated sweetener is then given a second coating of these hydrophobic materials and lecithin is added as a wetting agent to increase the affinity of the fat or wax for the APM crystals. Chewing gum and boiled hard candy are specifically taught applications for the sweetener delivery system.

U.S. Pat. No. 4,722,845 to Cherukuri et al discloses a stable, cinnamon-flavored chewing gum composition wherein a dipeptide or amino acid sweetener is protected from reacting with the degradative aldehydes of the flavor oil by encapsulating the sweetener in a mixture of fat and high melting point (106°) polyethylene wax. The materials are coated onto the aspartame crystals using a modified spray congealing technique to form aggregated particles that may be mixed into the gum base for longer lasting shelf life stability.

U.S. Pat. No. 4,816,265 also to Cherukuri discloses chewing gum compositions containing APM that is encapsulated with a mixture of a low molecular weight polyvinyl acetate (PVA) and an emulsifier. The sweetener is blended into a homogeneous melted molten mass of PVA and the resultant mixture is a semi-solid mass which is cooled to a solid and ground into particles with a U.S. standard mesh size of 30 to about 200. The sweeteners are protected from adverse conditions such as moisture, PH, temperature and reactive chemicals such as flavor oils in the gums.

U.S. Pat. No. 4,704,288 to Tsau et al discloses a heat stabilized form of APM for baking applications. Aspartame is first granulated to particles with a U.S. mesh size of from about 8 to about 40 that are then coated with partially dehydrogenated vegetable oil. Both the type of fat and particle size are critical to the stability of the sweetener which may allegedly be used in cakes, cookies and other baked goods.

U.S Pat. No. 4,816,265 to Zibell discloses chewing gum with a delayed release, high potency sweetener such as aspartame. The APM is initially coated with modified cellulose such as hydroxypropyl methyl cellulose. The APM particles are then mixed with a zein solution with a pH of from 11.5 to 12.5. The damp mix is then dried to produce twice coated particles of the high intensity sweetener which allegedly enchance the shelf life stability of the sweetener and produce a delayed release of sweetness when this gum is chewed.

PCT Application No. PCT/US88/02398 also to Tsau discloses another heat stabilized form of APM wherein the dipeptide crystals are "spheronized" into dense, non-porous granules of substantially spherical shape within a narrow particle size range. The dense, spherical granules are preferably further encapsulated with a hydrophobic coating such as fats, starches, proteins and/or fibers and allegedly possess both stability against moisture, heat and acidic conditions as well as possessing a sustained release functionality for dispersion of the sweetener throughout the food matrix over time.

U.S. Pat. No. 4,588,612 to Perkins et al discloses the compaction of needle-like crystals of a material such as aspartame into a plurality of dense chips which are then ground to an average particle size of 20 to 400 standard U.S. mesh. The granules are then spread on a fluid bed spray reactor and encapsulated with a molten hydrogenated lipid or wax. The encapsulated aspartame granules are disclosed as being useful in baking applications since the encapsulating material essentially protects the granule from degradation that would otherwise result from the effects of heat and alkaline pH. The Perkins et al. invention is principally useful with water insoluble coatings which will allegedly protect the APM granules from moisture and heat that is present during baking.

It is an object of the present invention to provide a dipeptide sweetener composition with improved longer lasting shelf life stability. It is a further object of the present invention to provide a stabilized dipeptide sweetener that is compressed and encapsulated with a fat or wax coating in a 1:1 ratio to give it a long lasting shelf life stability. More particularly, it is an object of the present invention to provide an encapsulated compressed APM composition which, through dry granulation technology, possesses a longer lasting shelf life useful in chewing gum compositions where moisture, pH, and reactive flavor oils are adverse degradative factors.

SUMMARY OF THE INVENTION

The present invention is an improved dipeptide sweetener with longer lasting shelf life stability that is particularly useful in chewing gum compositions and especially useful in cinnamon-flavored chewing gum. The dipeptide sweetener is encapsulated through an anhydrous process that compresses the crystals within a mixture of inert binder ingredients so as to form a solid tablet or sheet which is then ground into a fine granular powder (40-60 U.S. Standard mesh). The compressed cores are then coated with a hydrophobic material such as either fat or wax resulting in a dipeptide sweetener with improved shelf life stability in the presence of otherwise adverse flavor oils and high processing temperatures.

DETAILED DESCRIPTION OF THE INVENTION

Figure 1:
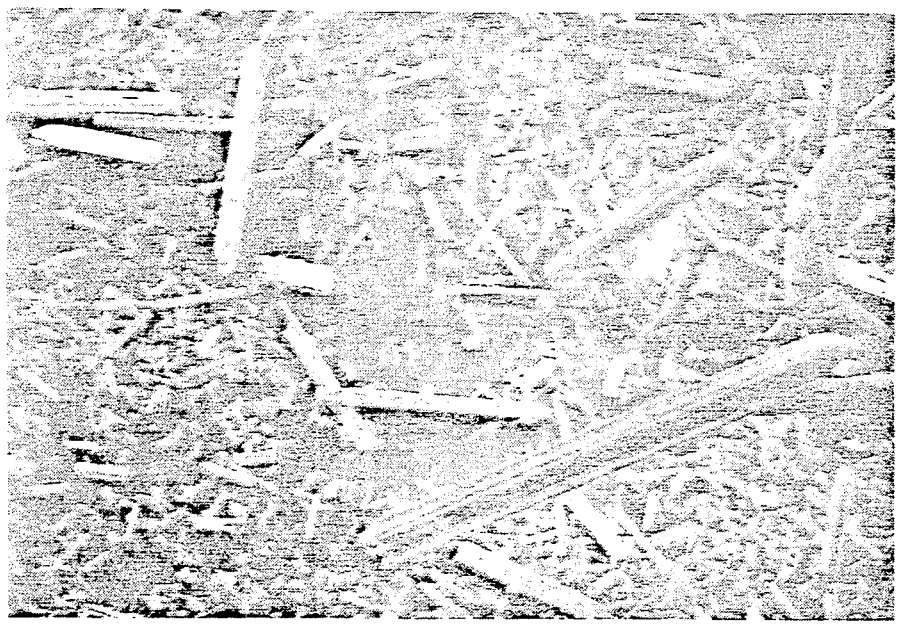
FIG. 1 is a micrograph (100 x) of unprocessed aspartame powder showing its needle-like, dendritic crystals.

The dipeptide sweetener compositions of the present invention are stabilized through a high pressure compaction process that imbeds the needle-like, dendritic crystal forms of aspartame into an anhydrous mixture of inert elements that further stabilize the sweetener from the adverse affects of temperature, moisture and reactive chemicals. Whereas the use of coatings such as fat, waxes, cellulose etc. have been used extensively in the past in an effort to protect materials such as aspartame from adverse conditions, the dendritic, needle-like shape of the crystals are highly irregular and difficult to impossible to coat in a complete and uniform manner. Moreover, even if the crystals were coated in their entirety, mechanical stresses and/or forces would inevitably break them off leading to exposed and unprotected APM at numerous places which is unsatisfactory.

The compositions of the present invention are comprised of a dipeptide sweetener such as aspartame, alitame and others. The sweetener is first combined in an anhydrous mixture or blend of a number of inert compounds which serve in a protective and binding capacity.

The amount of dipeptide sweetener used can vary depending upon the type of food application that it is used in and the degree of sweetness desired. The sweetener can comprise anywhere from 5-70% by weight of the core material, preferably 15-45% and most preferably 20-40% of the total weight of the core material. Cellulose, such as microcrystalline cellulose, is the major component of the core blend and can comprise anywhere from about 10% to about 90% by weight of the core and preferably 10%-60% and most preferably 20% to 30% of the total weight of the core material. This acts not only as a binder but produces protective functionality for the APM as a heat stabilizer as well as improved tabletting. Waxes and powdered cellulose also serve as suitable binding agents within the scope of the present invention.

A lubricity agent such as magnesium stearate, talc, mineral oil, stearic acid and the like is added to maximize the flow qualities of the anhydrous mixture prior to tabletting and also aids the compaction process as it prevents the APM granule from sticking to the compressor die. The lubricity agent comprises a deminimus portion of the encapsulated sweetener core and may be incorporated in the core in amounts of about 0.1-5.0%, preferably, about 0.5% to about 3.0% and most preferably from about 0.5%-1.0% is added to the anhydrous blend.

An inert material such as polyols, carbohydrates or calcium phosphates is added in a protective capacity to prevent the core sweetener material from reacting with certain constituents of the flavor oils and other chemicals. Cinnamon for example, contains aldehyde groups which react with the dipeptide and result in a loss of sweetness. Polyols suitable in the practice of the present invention include sorbitol, mannitol, xylitol or erythritol and are added in order to stabilize the dipeptide from the adverse conditions of heat, moisture and flavor oils. Mannitol is the polyol most preferred in the practice of the present invention in that it also improves the tabletting characteristics of the compressed granules. The polyols may be added to the anhydrous blend in amounts from 5.0%-80.0%, preferably 10%-50% and most preferably, 20% to 40% by weight is added to the blend. Carbohydrates such as polydextrose and palatinit as well as mono-, di- and tri-calcium phosphate also serve as suitable inert protective materials.

Finally, a non-sticking agent such as colloidol silicon dioxide ($SiO_2$) is added to the anhydrous blend to aid in the compaction/tabletting process and to prevent the caking or sticking of the aspartame particles. This component is added in relatively minor amounts and may consist of from 0.1%-3.0% by weight of the core composition, preferably 0.5%-2.0% and most preferably 1.0%-2.0%.

Figures 2A, 2B:
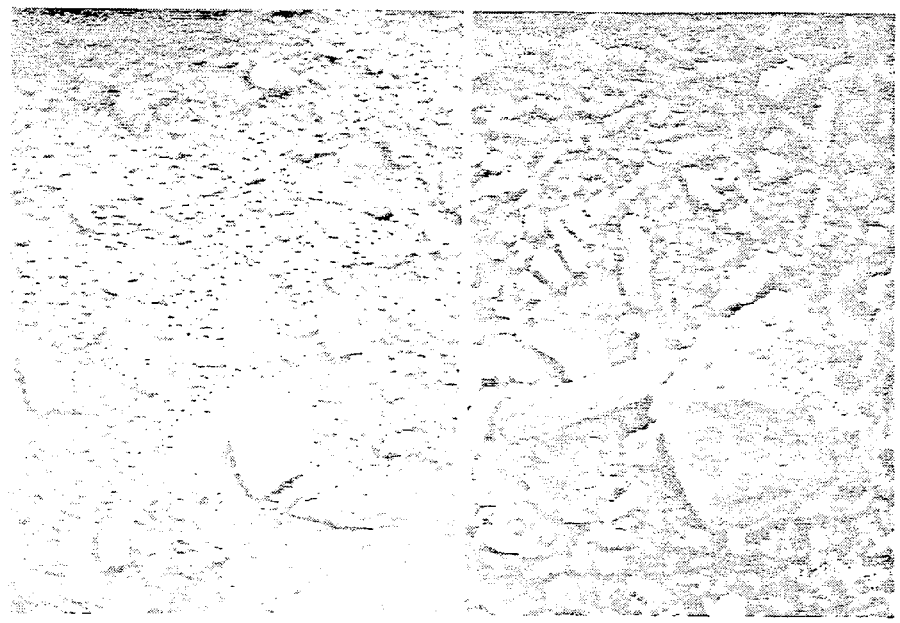
FIG. 2 is a micrograph (100 x) of the same aspartame powder in the shape of granular compacted cores produced after compression by the process of the present invention.
Figures 2C, 2D:

All of the ingredients are mixed under anhydrous conditions in a twin shell dry blender (Model LB-832, Patterson-Kelly Co., East Stroudsburg, PA) for ten (10) minutes. The mixed powder composition is fed into a compression tablet machine (Stokes Model B-3) and compressed into sweetener tablets of at least 200 newton. Preferably, the tablet is "slugged" (percompression or double-compression method). Regardless of the manner in which the powdered sweetener composition is compacted, the tablets or slugs are then milled using a Eureka TG2S grinder into granules or particle cores of about 30-45 mesh (350-590 microns) and coated. (See FIG. 2)

The compacted APM granules may then be coated with a fat such as animal fat, vegetable fat, waxes, cellulose, or mixtures thereof. This is readily achievable despite the non-uniformity of the particle size shape. Preferably, the particles are coated with a mixture of partially hydrogenated soybean oil and glycerol monostearate. Whereas the soybean oil may consist of from about 60% to about 99% and most preferably of from about 90% to about 98% by weight of the entire coating composition, the glycerol monostearate may be incorporated in amounts of from about 0.5% to about 80% and preferably of from about 0.5% to about 20%.

The coating process may be carried out using a standard fluidized bed coating apparatus such as the Verse Glatt Fluid Bed Agglomerator/Dryer Model GPCG-1 (Glatt Air Techniques, Inc., Ramsey, NJ). The compressed APM particle cores are suspended in an air stream and sprayed with the molten fat composition as it is passed through a compressed air nozzle as atomized particles and gradually coats the APM cores. The amount of coating applied to the core is preferably no more than a 1:1 APM core/fat ratio and may be applied as discrete layers during the fluidization process.

Whereas the encapsulated dipeptide sweetener may be used in many applications where long shelf life is a consideration and conditions such as reactive flavor ingredients, temperature, moisture and pH of the food matrix present a hostile or degradative environment, the present inventions is particularly useful in the incorporation in chewing gum and most particularly, cinnamon chewing gums wherein aldehyde components of the flavor oil react with the dipeptide sweeteners causing diketopiperazine formation. However, as FIG. 3 clearly shows, the APM granules of the present invention are also stable in the presence of high temperatures. The absence of any peaks in the Differential Scanning Colorimetry (DSC) Profile is indicative of no phase changes occurring in the APM granules even when heated to 100° C. The surprising and unexpected stability at these high temperatures make the granules of the present invention suitable for baking applications.

With regard to the chewing gum formulations in which the novel delivery system is employed, the amount of gum base employed will vary greatly depending on various factors such as the type of base used, consistency desired and other components used to make the final product. In general, amounts of about 5% to about 45% by weight of the final chewing gum composition are acceptable for use in chewing gum composition with preferred amounts of about 15% to about 25% by weight. The gum base may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight to the gum base.

A variety of traditional ingredients such as plasticizers or softeners such as lanolin, stearic acid, sodium stearate, potassium stearate, glyceryl triacetate, glycerine and the like for example, natural waxes, petroleum waxes, such as polyurethane waxes, paraffin waxes and microcrystalline waxes may also be incorporated into the gum base to obtain a variety of desirable textures and consistency properties. These individual additional materials are generally employed in amounts of up to about 30% by weight and preferably in amounts of from about 3% to about 20% by weight of the final gum base composition.

The chewing gum composition may additionally include the conventional additives of flavoring agents, coloring agents such as titanium dioxide, emulsifiers such as lecithin and glyceryl monostearate; and additional fillers such as hydroxide, alumina, aluminum silicates, calcium carbonate, and talc and combinations thereof. These fillers may also be used in the gum base in various amounts. Preferably the amount of fillers when used will vary from about 4% to about 30% by weight of the final chewing gum.

In the instance where auxiliary sweeteners are utilized in addition to those in the present delivery system, the present invention contemplates the inclusion of those sweeteners well known in the art, including both natural and artificial sweeteners. Thus, additional sweeteners may be chosen from the following non-limiting list, sugars such as sucrose, glucose (corn syrup), dextrose, invert sugar, fructose and mixtures thereof; saccharine and its various salts such as the sodium or calcium salt; cyclamic acid and its various salts such as the sodium salt; free aspartame, dihydrochalcone compounds, glycyrrhizin; Stevia rebaudiana (Stevioside); and sugar alcohols such as sorbitol, sorbitol syrup, mannitol, xylitol, and the like. Also contemplated as an additional sweetener is the nonfermentable sugar substitute (hydrogenated starch hydrolysate) which is described in U.S. Pat. No. Re. 26,959. Also contemplated is the synthetic sweetener 3,6-dihydro-6-methyl-1-1,2, 3-oxathiazin-4-one-2,2-dioxide, particularly the potassium (Acesulfame-K), sodium and calcium salts thereof as described in German Patent No. 2,001,017.7.

Suitable flavorings include both natural and artificial flavors, and mints such as peppermint, menthol, artificial vanilla, cinnamon, various fruit flavors, both individual and mixed, and the like are contemplated. Preferably the cinnamon is used and the flavorings are generally utilized in amounts that will vary depending upon the individual flavor, and may, for example, range in amounts of about 0.5% to about 3% by weight of the final chewing gum composition weight.

The colorants useful in the chewing gums of the present invention include the pigments such as titanium dioxide and may be incorporated in amounts of up to about 1% by weight, preferably up to about 6% by weight. Also, the colorants may include other dyes suitable for food, drug and cosmetic applications, and known as F.D. & C. dyes and the like. The materials acceptable for the foregoing spectrum of use are preferably water-soluble. Illustrative examples include indigo dye, known as F.D. & C. Blue No. 2, which is the disodium salt of 5.5'-indigotindisulfonic acid. Similarly, the dye known as F.D. & C. Green No. 1, comprises a triphenylmethane dye and is the monosodium salt of 4-[4-N-ethyl-p-sulfobenzylamino)diphenylnethylene]-[1-(N-ethyl-N-p-sulfoniumbenzyl)-2-5-cyclohexadienimine]. A full recitation of all F.D. & C. and D. & C. and their corresponding chemical structures may be found in the KirkOthmer Encyclopedia of Chemical Technology, in Volume 5, at Pages 857-884, which text is accordingly incorporated herein by reference.

The chewing gum of the invention may be in any form known in the art, such as stick gum, slab gum, chunk gum, shredded gum, hard coated gum, tabletted gum, as well as center-filled gum.

The process of preparing the inventive chewing gum compositions is as follows. The gum base is melted (about 85° to about 90°), cooled to 78° C. and placed in a pre-warmed (60° C.) standard mixing kettle equipped with sigma blades. The emulsifier is then added and mixed in. Next, a portion of the sorbitol and the glycerin is added and mixed in for an additional 3 to 6 minutes. The mixing kettle is cooled and mannitol and the remainder of the sorbitol and glycerin are then added and mixing is continued. At this time, the unflavored chewing gum temperature is about 39° C.-42° C. Flavor oil is then added and incorporated into the base and the mixing is continued. Finally, the encapsulated dipeptide sweetener material is added and mixed for an additional 1 to 10 minutes. The encapsulated dipeptide is added as the last ingredient. The final gum temperature is about 39° C. to about 43° C. The chewing gum composition is then discharged from the kettle, rolled, scored and formed into chewing gum pieces.

The following examples are provided in an effort to set forth the various aspects of the present invention and to provide further appreciation for its advancement in the art. It is to be remembered that they are for illustrative purposes only and that minor alterations can be made in the types and amounts of materials used or processing parameters applied. They should therefore be regarded as illustrations only and not restrict the spirit and scope of the invention as recited in the claims that follow. Example 1

Several core formulations (A-E) using aspartame as the dipeptide sweetener were used to make the encapsulated compositions of the present invention. Table 1 represents the amounts of each component expressed as a percent by weight of the entire core sample. The ingredients were mixed under anhydrous conditions as a dry powder without the aid of water or other solvent in a twin shell dry blender (Model LB-832, Patterson Kelly Co., East Stroudsburg, PA.) The ingredients were mixed for ten (10) minutes and compressed into tablets of 0.875-1.0 inches in diameter with a hardness of 200 newton as shown by a Key HT 300 hardness tester. The tablets were then milled into granules of from about 30-45 U.S. standard mesh size (350-590 microns) and collected.

TABLE 1

| INGREDIENTS | EXAMPLES | | | | |
|---|---|---|---|---|---|
| | #A | #B | #C | #D | #E |
| ASPARTAME | 30.0% | 30.0% | 30.0% | 30.0% | 30.0% |
| MICRO CRYSTALLINE | 68.3% | — | 20.0% | 23.3% | — |
| CELLULOSE PH-105 | — | — | — | — | 30.0% |
| MAGNESIUM STEARATE | 0.7% | 0.7% | 1.0% | 0.7% | 1.0% |
| DICALCIUM PHOSPHATE | — | 68.3% | 47.0% | 22.0% | 37.0% |

TABLE 1-continued

| INGREDIENTS | EXAMPLES | | | | |
|---|---|---|---|---|---|
| | #A | #B | #C | #D | #E |
| MANNITOL | — | — | — | 22.0% | — |
| COLLOIDAL SILICON DIOXIDE | 1.0% | 1.0% | 2.0% | 2.0% | 2.0% |
| | 100% | 100% | 100% | 100% | 100% |

The compressed sweetener core granules were then coated with a mixture of partially hydrogenated soybean oil and glycerol monostearate using a Verse Glatt Fluid Bed. Agglomerator/Dryer Model CPCG-1 in which the core materials were suspended in a stream of air and spray coated. Examples F-J as shown in Table II represent the formulations for core examples A-E respectfully, based on a weight percentage of the entire fat encapsulated core.

TABLE II

| INGREDIENTS | EXAMPLES | | | | |
|---|---|---|---|---|---|
| | #F | #G | #H | #I | #J |
| ASPARTAME | 20.0% | 15.0% | 15.0% | 15.0% | 15.0% |
| MICRO-CRYSTALLINE PH-102 | 45.5% | — | 10.0% | 11.6% | — |
| CELLULOSE PH-105 | — | — | — | — | 15.0% |
| MAGNESIUM STEARATE | 0.5% | 0.4% | 0.4% | 0.4% | 1.0% |
| DICALCIUM PHOSPHATE | — | 34.1% | 24.1% | 11.0% | 18.5% |
| MANNITOL | — | — | — | 11.0% | — |
| COLLOIDAL SILICON DIOXIDE | 0.7% | 0.5% | 0.5% | 1.0% | 1.0% |
| PARTIALLY HYDROGENATED SOYBEAN OIL | 31.6% | 47.5% | 47.5% | 47.5% | 47.5% |
| GLYCEROL MONOSTEARATE | 1.7% | 2.5% | 2.5% | 2.5% | 2.5% |
| | 100% | 100% | 100% | 100% | 100% |

The encapsulated aspartame compositions F-J were incorporated into five (5) samples of cinnamon-flavored chewing gum using the standard gum base technology described infra. The chewing gums were then analyzed at two, four and eight week intervals to determine the amount of undegraded aspartame remaining in the gums. The amount remaining is a direct correlation with the amount degraded and therefore allows a comparative analysis of the sweetness stability provided by the encapsulated dipeptide sweeteners of the present invention with those of other encapsulation methodologies.

Figure 3:
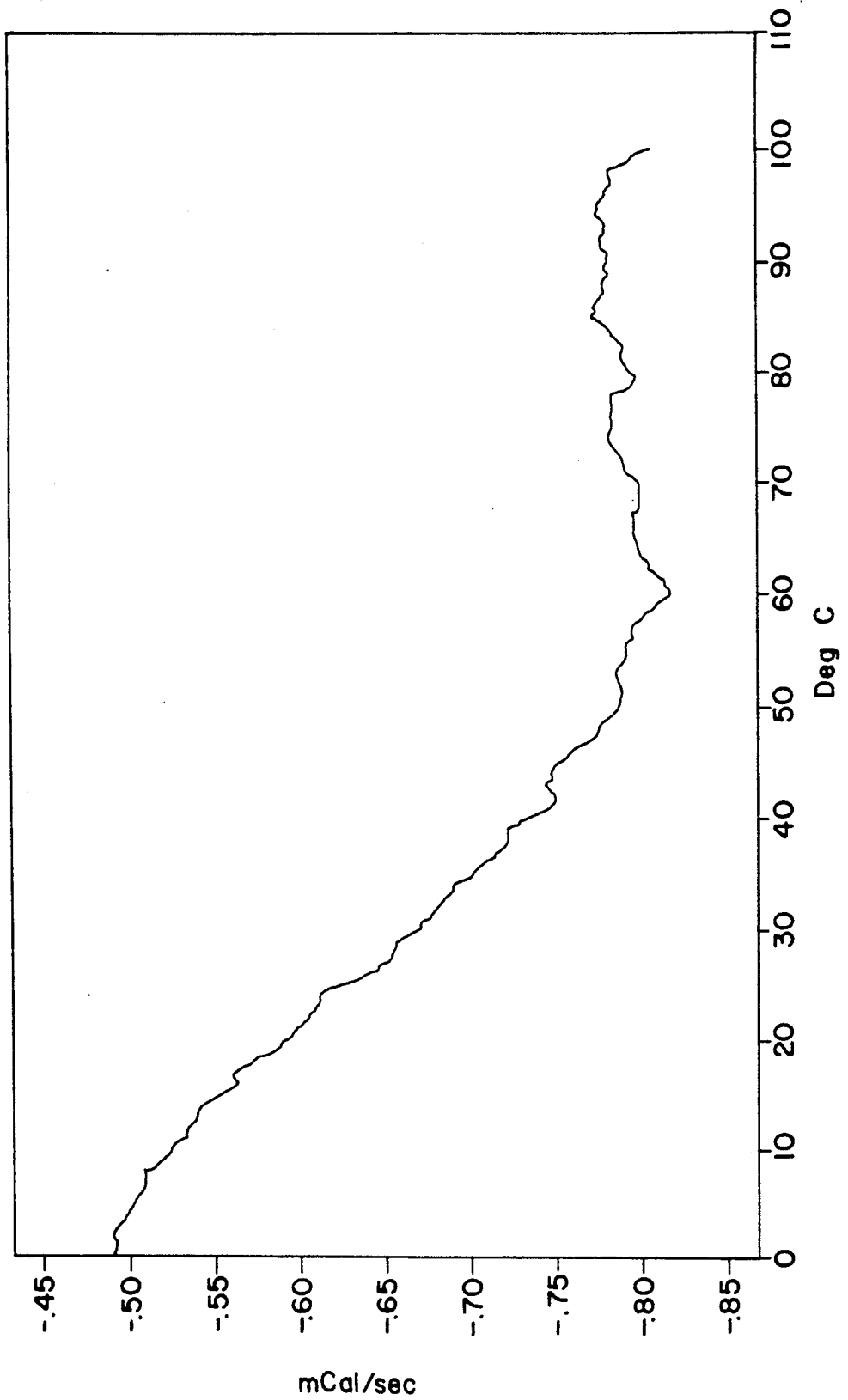
FIG. 3 is a Differential Scanning Colorimetry profile of the compacted APM core materials of the present invention.
Figure 4:
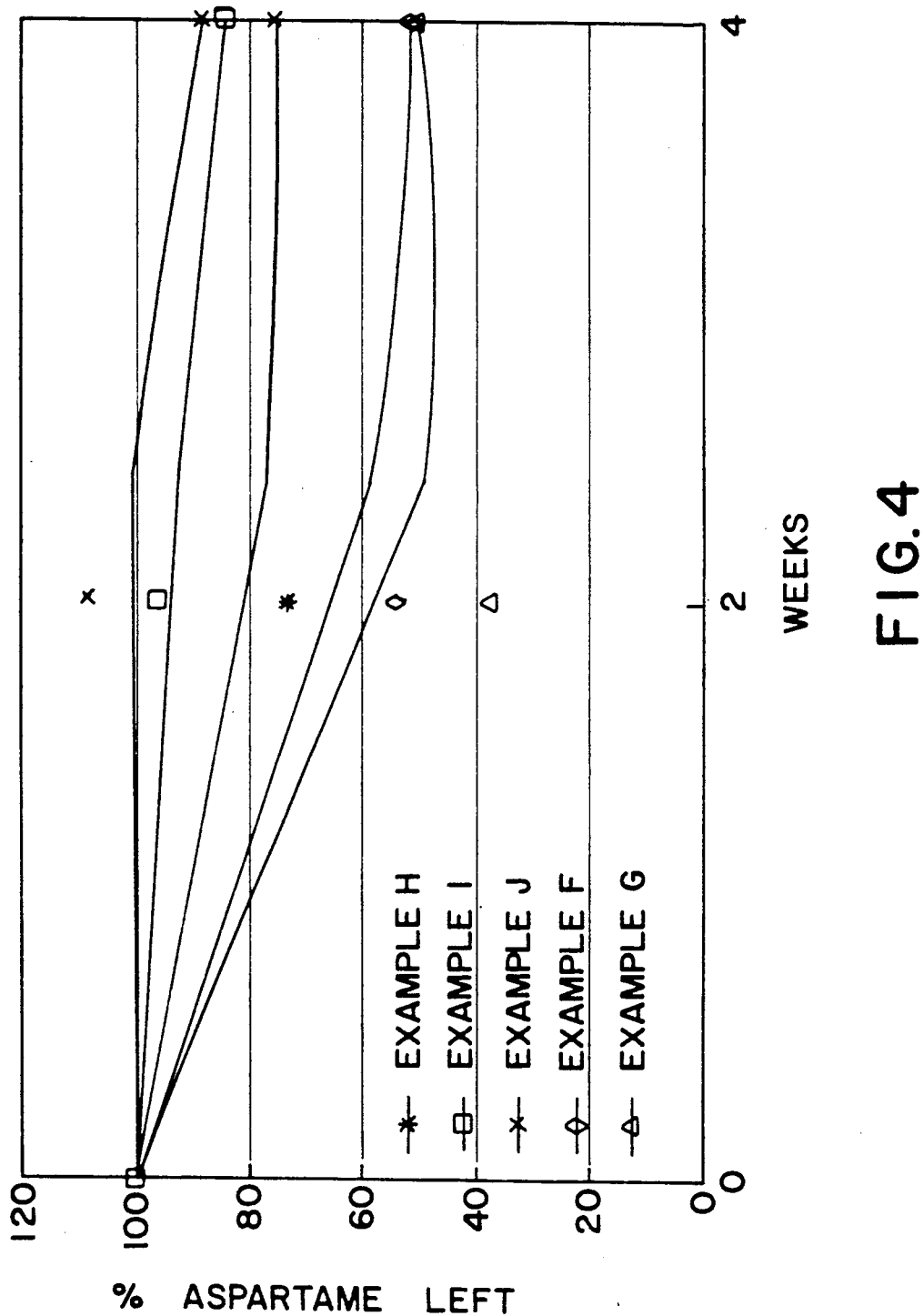
FIG. 4 is a graph displaying the shelf life stability of the encapsulated aspartame compositions of the present invention in cinnamon gum as a function of percent APM remaining over time.
Figure 5:
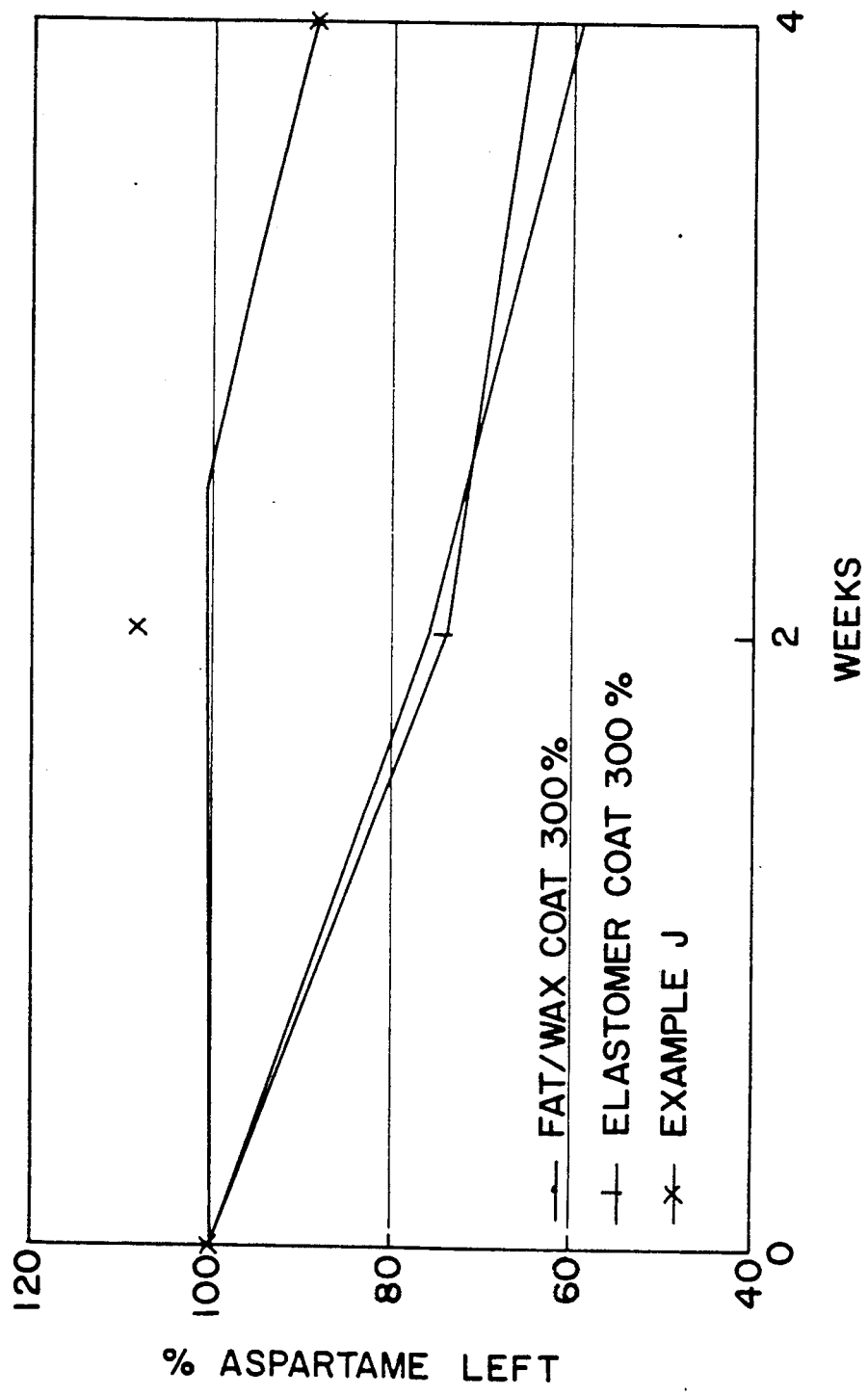
FIG. 5 is a graph comparing the shelf life stability of the coated core material with that of two coated aspartame samples of the prior art.

FIG. 3 graphically represents the rate of aspartame degradation with respect to each one of five core compositions A-E encapsulated as sweetener sample F-J in cinnamon gum at 30° C. over time. Clearly, the chewing gum composition J consisting of core formulation E gave the best stability over time while chewing gum containing APM not compressed according to the present invention yet coated with three times (3 X) more fat/wax or elastomer materials showed the least amount of stability. Core materials H and I showed a dramatic improvement in stability but core sample J was clearly the superior sample.

Shelf life stability is not just a function of coating but is increased through physical/chemical changes of the aspartame crystals brought about by compaction of the needle-like crystals at high pressure so as to inbed them within naturally stabilizing inert matrix materials. Without being bound to any sort of theory, the tightly compacted APM becomes selected thereby prohibiting moisture and other reactive chemicals from invading the spaces that otherwise exist between the dendritic crystals. This compaction prevents degradation by reducing the surface area upon which heat, moisture and other chemicals can react. The milled granules are easier to coat since a uniform layer is far easier to achieve with the compacted, denser crystals. To be effective as protective barriers, coatings must be able to wet and adhere to the crystalline surface which is not generally possible considering the needle-like tips and other spike-like shape variations of pure aspartame powder. The coatings, in addition to being protective barriers, must be flexible enough to conform to the surface irregularities without cracking due to mechanical stresses which occur when the sweetener is incorporated into one of the numerous food applications, chewing gum in particular. The compacted granule not only facilitates such coating but is self-stabilized to a degree as well.

What we claim is:

1. An encapsulated dipeptide sweetener composition with improved shelf life stability produced by the process comprising:
   (a) mixing a dipeptide sweetener under anhydrous conditions with at least one binding agent, a lubricity agent, and an inert material;
   (b) compacting said mixture into a tablet using high compression of at least 200 newtons;
   (c) granulating said tablets into smaller particle cores; and
   (d) coating said particle cores with a fat material.

2. The encapsulated sweetener composition of claim 1 wherein said dipeptide is selected from the group consisting of aspartame, alitame and mixtures thereof.

3. The encapsulated sweetener composition of claim 2 wherein said binding agent is selected from the group consisting of microcrystalline cellulose, powdered cellulose waxes, and mixtures thereof.

4. The encapsulated sweetener composition of claim 3 wherein said lubricity agent is selected from the group consisting of magnesium stearate, mineral oil, talc, zinc, stearate, calcium stearate, polyethylene glycol, stearic acid, sodium aluminosilicates and mixtures thereof.

5. The encapsulated sweetener composition of claim 4 wherein said inert material is selected from the group consisting of polyols, calcium phosphates, carbohydrates and mixtures thereof.

6. The encapsulated sweetener composition of claim 5 wherein said polyol is selected from the group consisting of mannitol, xylitol, erythritol, sorbitol and mixtures thereof.

7. The encapsulated sweetener composition of claim 6 wherein said calcium phosphate is selected from the group consisting of calcium phosphate, dicalcium phosphate, tri-calcium phosphate and mixtures thereof.

8. The encapsulated sweetener composition of claim 7 wherein said carbohydrate is selected from the group consisting of polydextrose, palatinit and mixtures thereof.

9. The encapsulated sweetener composition of claim 8 wherein said compacted granules range in size from approximately 25 to about 50 U.S. standard mesh.

10. The encapsulated sweetener composition of claim 9 wherein said dipeptide sweetener comprises approximately 5% to about 70% of the particle core by weight.

11. The encapsulated sweetener composition of claim 10 wherein said dipeptide sweetener comprises approximately 20% to about 40% of said particle core by weight.

12. The encapsulated sweetener composition of claim 11 wherein said binding agent comprises approximately 10% to about 60% by weight of said particle core.

13. The encapsulated sweetener composition of claim 12 wherein said lubricity agent comprises approximately 0.5% to about 3.0% by weight of said particle core.

14. The encapsulated sweetener composition of claim 13 wherein said inert material comprises approximately 10% to about 50% by weight of said particle core.

15. The encapsulated sweetener composition of claim 14 wherein said particle core has a hardness of at least 200 newtons.

16. A chewing gum composition with improved shelf life stability and longer lasting sweetness containing the encapsulated dipeptide sweetener composition of claim 1.

17. The chewing gum composition of claim 16 further characterized by a flavor selected from the group consisting of cinnamon, spearmint, peppermint, fruit or mixtures thereof.

18. The chewing gum composition of claim 17 wherein said flavor is cinnamon.

19. A process for the preparation of an encapsulated dipeptide sweetener composition consisting of:
   a) mixing a dipeptide sweetener under substantially anhydrous conditions with a binding agent, a lubricity agent, and an inert material;
   b) compacting said mixture into a tablet using high compression of at least 200 newtons;
   c) granulating said tablets into smaller dense particle cores; and
   d) coating said particle cores with a fat.

20. The process of claim 17 wherein said dipeptide is selected from the group consisting of aspartame, alitame and mixtures thereof.

21. The process of claim 18 wherein said binding agent is selected from the group consisting of microcrystalline cellulose, powdered cellulose, waxes and mixtures thereof.

22. The process of claim 19 wherein said lubricity agent is selected from the group consisting of magnesium stearate, mineral oil, talc, zinc stearate, polyethylene glycol, stearic acid, sodium alumino-silicates and mixtures thereof.

23. The process of claim 22 wherein said inert material is selected from the group consisting of polyols, calcium phosphates, carbohydrates and mixtures thereof.

24. The process of claim 20 wherein said polyol is selected from the group consisting of mannitol, sorbitol, xylitol, erythritol and mixtures thereof.

25. The process of claim 24 wherein said calcium phosphate is selected from the group consisting of calcium phosphate, dicalcium phosphate, tri-calcium phosphate and mixtures thereof.

26. The process of claim 25 wherein said carbohydrate is selected from the group consisting of polydextrose, palatinit and mixtures thereof.

27. The process of claim 26 wherein said compacted granules range in size from approximately 25 to about 50 U.S. Standard mesh.

28. The process of claim 26 wherein said dipeptide sweetener comprises approximately 5% to about 70% of the particle core by weight.

29. The process of claim 27 wherein said dipeptide sweetener comprises approximately 20% to about 40% of said particle core by weight.

30. The process of claim 28 wherein said binding agent comprises approximately 10% to about 60% by weight of said particle core.

31. The process of claim 29 wherein said lubricity agent comprises approximately 0.5% to about 3.0% by weight of said particle core.

32. The process of claim 30 wherein said polyol comprises approximately 10% to about 50% by weight of said particle core.

33. The process of claim 31 wherein said particle core has a hardness of at least 200 newtons.

* * * * *